United States Patent [19]

Bean

[11] Patent Number: 5,136,415
[45] Date of Patent: Aug. 4, 1992

[54] MULTI-REFLECTION SCANNER

[75] Inventor: Lloyd F. Bean, Rochester, N.Y.

[73] Assignee: Xerox Corporation, Stamford, Conn.

[21] Appl. No.: 560,856

[22] Filed: Jul. 31, 1990

[51] Int. Cl.$^5$ .......................................... G02B 26/08
[52] U.S. Cl. ................................ 359/213; 359/199; 359/225
[58] Field of Search ................... 350/6.1–6.91, 350/487, 620; 250/234–236; 359/196–226; 358/109, 113, 480

[56] References Cited

U.S. PATENT DOCUMENTS

| | | | |
|---|---|---|---|
| 2,234,919 | 3/1941 | Ressler | 358/416 |
| 3,612,642 | 10/1971 | Dostal | 350/6.6 |
| 3,877,818 | 4/1975 | Button et al. | 356/416 |
| 3,902,783 | 9/1975 | Bodlaj | 350/487 |
| 4,662,709 | 5/1987 | Brueggemann | 350/6.7 |
| 4,682,842 | 7/1987 | Brueggemann | 350/6.7 |
| 4,691,999 | 9/1987 | Wheeler | 350/620 |
| 4,796,962 | 1/1989 | DeJager et al. | 350/6.8 |
| 4,796,965 | 1/1989 | Ishikawa | 350/6.8 |
| 4,805,974 | 2/1989 | Brueggemann et al. | 350/6.7 |
| 4,870,273 | 9/1989 | Brueggemann | 250/235 |
| 4,953,961 | 9/1990 | Uzhayakar | 350/6.5 |
| 4,960,312 | 10/1990 | Razzaghi | 350/6.8 |

FOREIGN PATENT DOCUMENTS 61-134726  6/1986  Japan ...................... 350/6.5
63-113517  5/1988  Japan ...................... 350/6.1

OTHER PUBLICATIONS

Michael Harrigan, "Double Reflecting Polygon Scanner", Xerox Disclosure Journal–vol. 15, No. 4, Jul.-/Aug. 1990, pp. 219–221.

Primary Examiner—Rodney B. Bovernick
Assistant Examiner—Thong Nguyen
Attorney, Agent, or Firm—Oliff & Berridge

[57]  ABSTRACT

Optical scanners having amplified scan capabilities are presented. The scanned beam is reflected a plurality of times between two opposed reflective surfaces, one of which moves with respect to the other. In one arrangement, both reflective surfaces are mutually driven by a tuning fork on which the reflective surfaces are mounted. The design provides a stable, reliable, bidirectional scan. Scan angles and frequencies can be varied by control of electronical drive systems for the tuning fork.

30 Claims, 7 Drawing Sheets

MULTI-REFLECTION SCANNER

BACKGROUND OF THE INVENTION

1. Field of the Invention

This invention relates to optical scanners and particularly to scanners for scanning a coherent beam of radiation for electrophotographic copiers and printers.

2. Description of the Related Art

Optical scanners utilizing a polygonal mirror body rotated about an axis are widely used. Such scanners have several drawbacks. Very slight differences in the angular positioning or planarity of the faces of the polygon can cause the scanned beam to "wobble", which results in a variation in the placement of the beam on the object surface. This can relate in unreliable data transmission. Further, each such polygon has its own "signature" and it is difficult to obtain polygonal scanners having a high degree of uniformity. Moreover, the drive systems for the scanners are subject to wear, which imparts additional wobble and other inconsistencies over the life of the scanner unit. Also, these scanners are unidirectional in the sense that the scanned beam is only moved in the direction of rotation of the polygonal mirror. In addition, the scan characteristics of the polygonal type scanner are limited by the mechanical parameters of the scanners, such as the size and number of the mirror faces and the drive speed range of the scanner motor. Further, such units are somewhat large and have significant space requirements. In addition, units with acceptable levels of precision are expensive.

Galvanometer scanners are also used for scanning optical beams. Such scanners rotate a reflected surface back and forth in an arc to scan an incident beam. These scanners have limited scan deflection capabilities.

OBJECTS AND SUMMARY OF THE INVENTION

It is an object of the invention to provide an optical scanner of high reliability having no need for bearing surfaces or parts subject to wear;

It is a further object of the invention to provide an optical scanner which is bidirectional;

It is a further object of the invention to provide a scanner which is easily electronically controllable;

It is an additional object of the invention to provide an optical scanner that is small in size and weight; and It is a further object of the invention to provide an optical scanner of reduced complexity and lower cost.

These and other objects are achieved, and the shortcomings discussed above are overcome, by providing an optical channel comprising a pair of opposed reflective surfaces, at least one of which is moved cyclically with respect to the other. The channel is arranged to provide multiple reflections of an incident beam. The scan width of the exiting beam is amplified in accordance with the number of reflections between the two reflecting surfaces. In one arrangement, the two reflecting surfaces are mounted on an oscillating element, such as the tines of a tuning fork. In other arrangements, an optical path is formed between two reflective surfaces, one of which is rotated about an axis with respect to the other.

BRIEF DESCRIPTION OF THE DRAWINGS

The invention will be described in detail with reference to the following drawings in which like reference numerals refer to like elements and wherein.

DESCRIPTION OF THE PREFERRED EMBODIMENT

Figure 1:
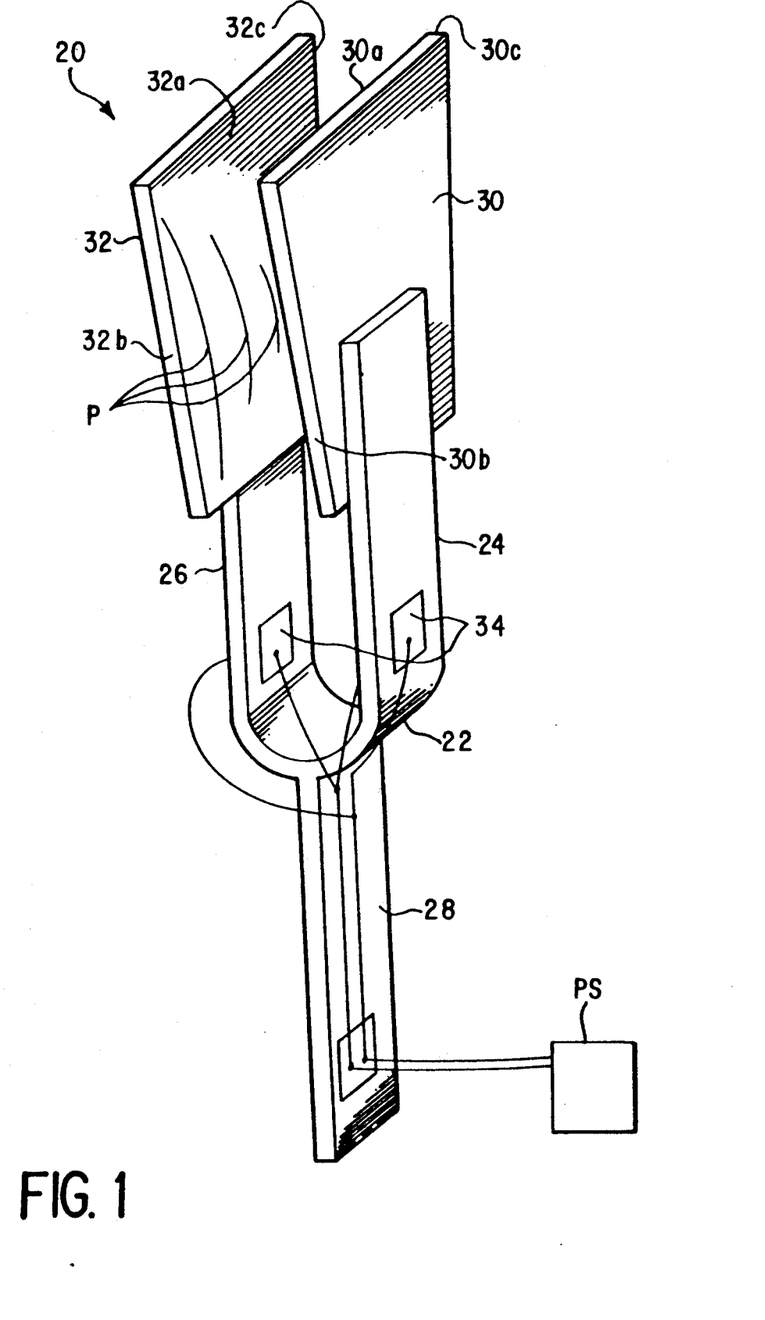
FIG. 1 is an isometric view of a scanner in accordance with the invention utilizing a tuning fork driver.

FIG. illustrates one preferred design of scanner 20 embodying the invention. In the design of FIG. 1, the scanner 20 includes a tuning fork 22 having a pair of opposed tines 24 and 26 mutually joined to a stem 28. The tuning fork 22 can be made from a wide variety of metallic materials commonly used for this purpose. Tuning forks made of stainless steel have been found especially useful because they have a good coefficient of restitution and do not heat up as much as other materials investigated.

Figure 3:
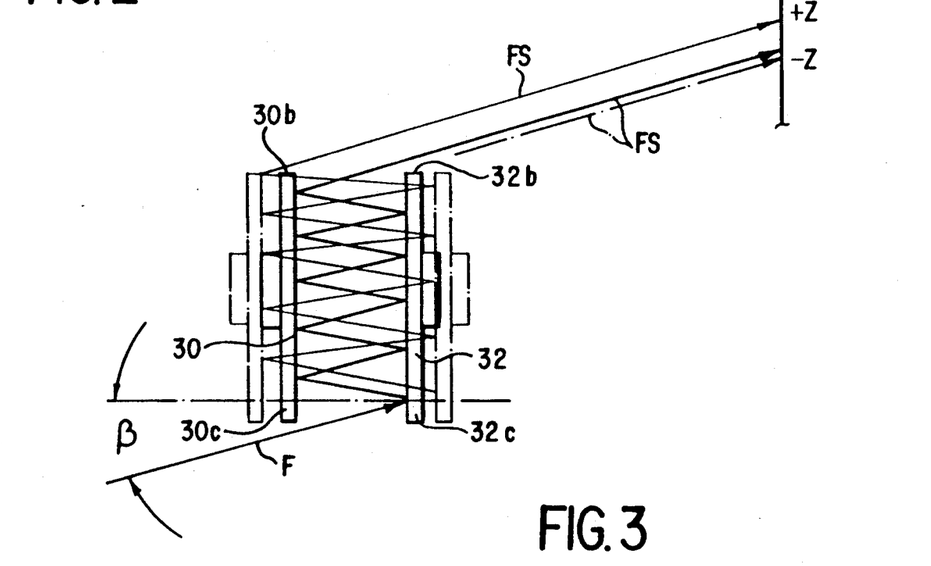
FIG. 3 is a schematic top view of the scanner of FIG. 1 showing the optical path of the beam through the scanner.

A mirror 30 is mounted on the inside of tine 24 with the reflective surface 30a of the mirror facing inwardly. Similarly, mirror 32 is mounted on the inside of tine 26 with its reflective surface 32a facing reflective surface 30a of mirror 30. In the FIG. 1 embodiment, surfaces 30a and 32a are substantially parallel. Referring to FIG. 3, it is desirable to have the mirrors offset laterally so that, for example, the edge 32c of mirror 32 extends outwardly slightly beyond the edge 30c of mirror 30. Similarly, edge 30b of mirror 30 extends a short distance beyond edge 32b of mirror 32. Such an arrangement allows a beam having a relatively large cross section to be introduced into the scanner 20. This yields the advantage of increased optical resolution of the scanner system. In addition, such an arrangement permits the beam to be directed into the scanner and exit from the scanner at desirable angles of incidence and reflection, as will appear from the following discussion. In this embodiment 30 and 32 have substantially planar reflective surfaces 30a and 32a. For use with lasers, the mirrors are preferably of the dielectric type for minimizing reflective losses.

Figure 4:
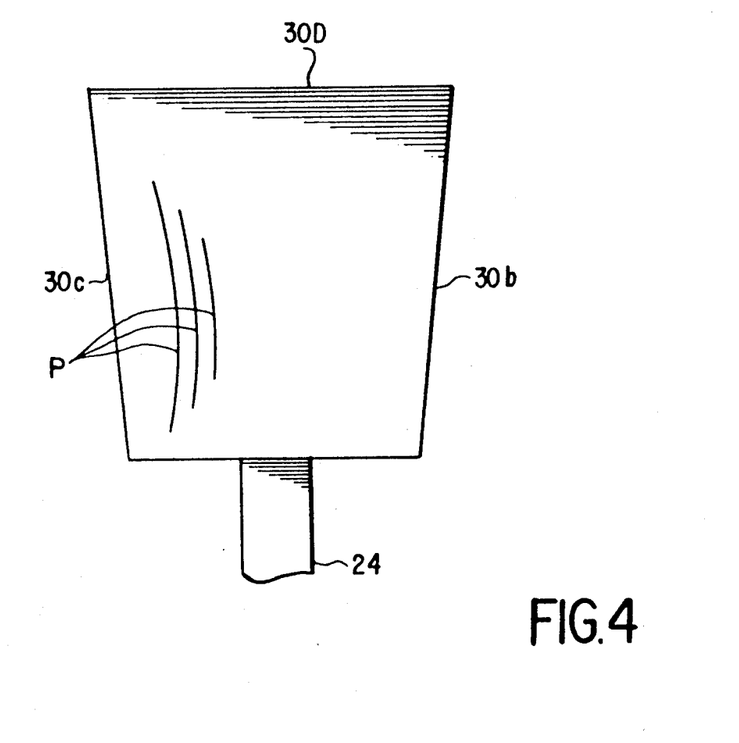
FIG. 4 is a partial elevational view showing a preferred form of mirror for the scanner of FIG. 1.

It has been found desirable, to make mirrors 30 and 32 in a trapezoidal shape as shown in FIG. 4, especially when used to scan a beam of circular cross section. This shape is desirable because the scan P becomes canted (as shown in FIG. 1), with the amount of displacement being greater at the end of the scan adjacent the top edge 30D of the mirror, thereby necessitating the wider dimension of the trapezoid to be placed at the top. The mirrors are made trapezoidal so that they are symmetrical with respect to a vertical midline of the mirror. However, it should be realized that mirrors having a wide variety of shapes can be utilized; such shapes may be influenced by the cross-section of the beam to be scanned and the orientation of the scanner.

Figure 5:
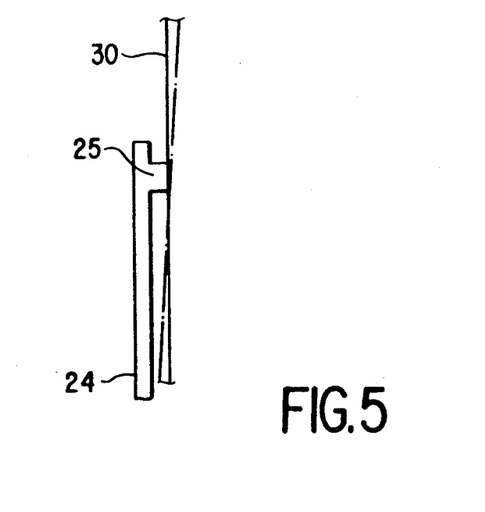
FIG. 5 is a partial side view of a scanner as in FIG. 1 showing mounting of a mirror on a tuning fork.

Referring to FIG. 5, it has also been found desirable to mount the mirrors in spaced relation to the interior surface of each tine. As shown, the tine 24 is made with an upstanding boss 25 which extends laterally inwardly toward the interior of the tuning fork. The mirror 30 is mounted on the boss 25 by suitable means such as adhesives. Such an arrangement avoids changes in shape of the tine being imparted to the mirror, which might occur if the mirror is affixed directly to the tine. It also allows the mirror to flex, as it is being oscillated by the tine 24, without coming into contact with the tine, as represented by the dotted line position of the mirror 30 shown in FIG. 5. This prevents the mirror from interfering with the resonant oscillation of the tuning fork. The ability of the mirror to deflect also enhances the scanned beam angle.

The scanner 20 also includes a driving means for oscillating the tines of the tuning fork. In a preferred arrangement, piezoelectric drivers, such as PZT ceramic piezoelectric elements, are mounted on the tines 24, 26. In a preferred arrangement, drivers 34 are mounted on the inside and outside surfaces of each of the tines, although a single pair of drivers mounted on the exterior of each of the tines or an interior of each of the tines could be used. The drivers 34 are energized by a suitable power supply PS, preferably one capable of varying the amplitude and frequency of the power supplied to the drivers 34. For maximum efficiency, the drivers 34 are driven at the resonant frequency of the tuning fork. Suitable drive circuits are known and no further detailed explanation is necessary. Further, the tines can be driven by other means, such as magnetically.

Figure 2:
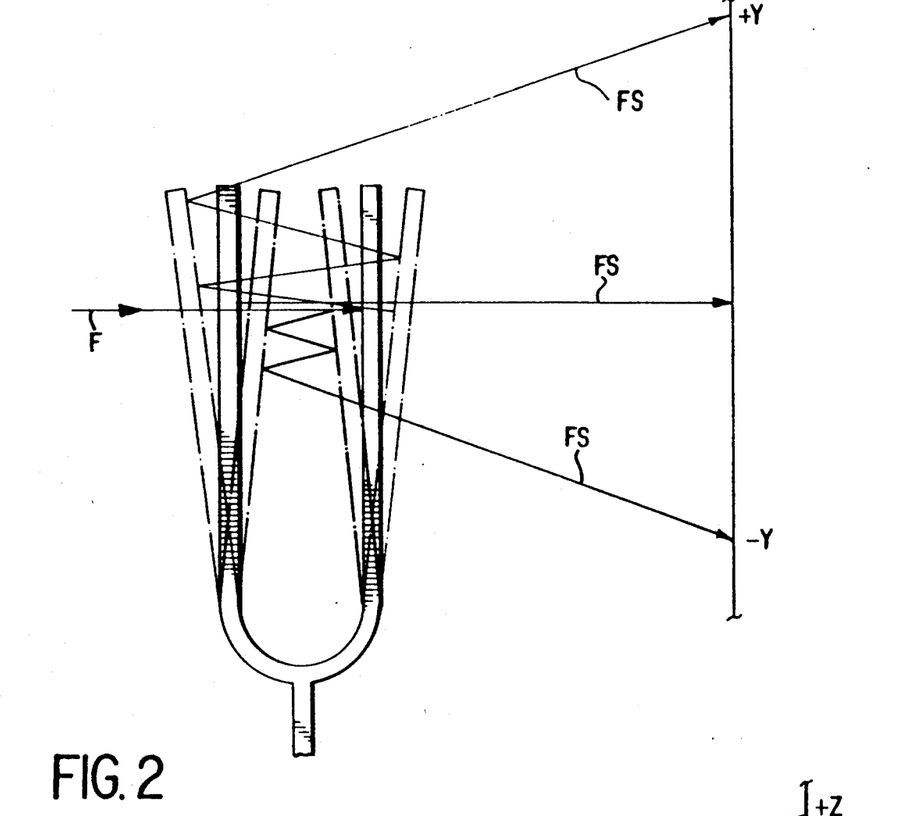
FIG. 2 is a schematic drawing of the scanner of FIG. 1 illustrating the Y displacement of the beam.

Referring to FIGS. 2 and 3, operation of the scanner shown in FIG. 1 will now be described. The incoming beam F to be scanned, such as a laser beam, for example, is reflected onto mirror 32 at an angle of incidence $\beta$ (FIG. 3) relative to a line perpendicular to the mirror surfaces 30a, 32a at rest. The reflective surfaces of the mirrors 30 and 32 form between them a channel for multiple reflections of the beam between the two mirrors. As the beam is travelling transversely through the scanner, the tines of the tuning fork are oscillating as shown in FIG. 2 to positions mutually away from each other, as shown in the dotted line position of FIG. 2, or to positions wherein the tines are closer to each other, as shown in chain line representation. This movement causes the beam to scan vertically along the mirror surfaces, each successive scan line on the mirrors having a greater length. As the beam exits the scanner, the scanned beam FS is scanned vertically, as shown in FIG. 2, between the position +Y, which corresponds to the tine apart condition, to the point −Y which corresponds to the tine together position. It should be noted that in FIG. 3, the tine together position is not shown in order to maintain clarity of the illustration.

In the scanner illustrated in FIGS. 1-3, the length of the beam scan lines P and thus the scanned angle can be calculated as a function of the number of reflections and the amount of mirror deflection. Such calculations can be derived by routine considerations of the geometry of the system and further details thereof are not necessary here. The number of reflections through the optical channel between mirror surfaces 30a and 32a is influenced by the angle of incidence $\beta$ of the incoming beam and the width of the mirror surfaces.

The deflection of the beam is influenced by the amount of deflection of the tines. Varying the power supplied to the piezo electric drivers 34 varies the deflection of the tines and changes the length of the scan. Thus, control of scan length can be effected electrically by controlling the amount of power supplied to drivers 34. Frequency of scan can be changed by varying the frequency of the power supplied to the drivers 34.

Figure 6A:
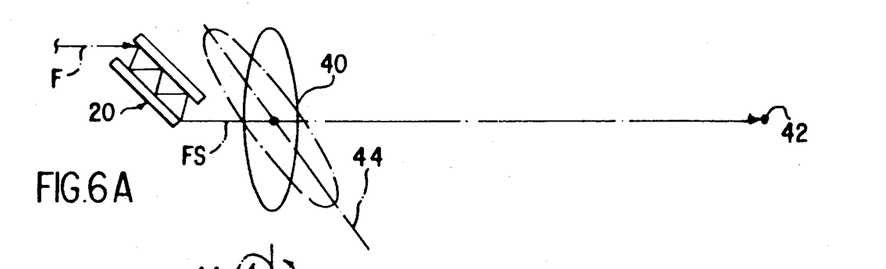
FIG. 6A is a schematic illustration of a top view of an optical system for linearizing the scan.
Figure 6B:
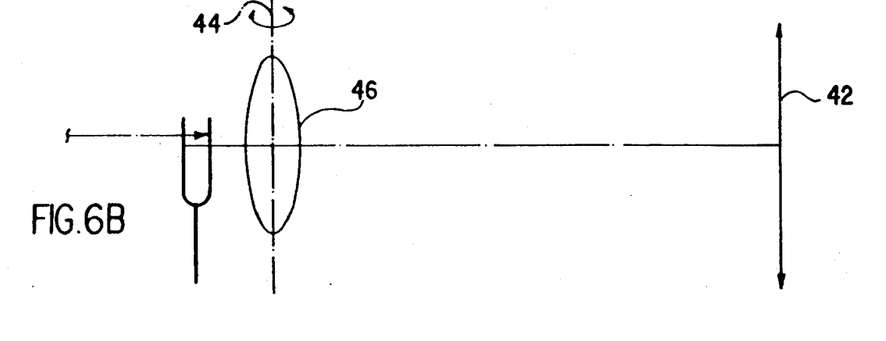
FIG. 6B is a side schematic illustration of the scan linearizing system of FIG. 6A.
Figure 7A:
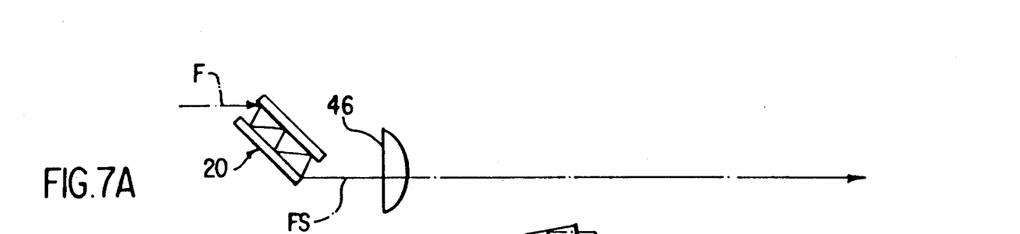
FIG. 7A is a schematic top illustration of another form of optical system for linearizing the scan.
Figure 7B:
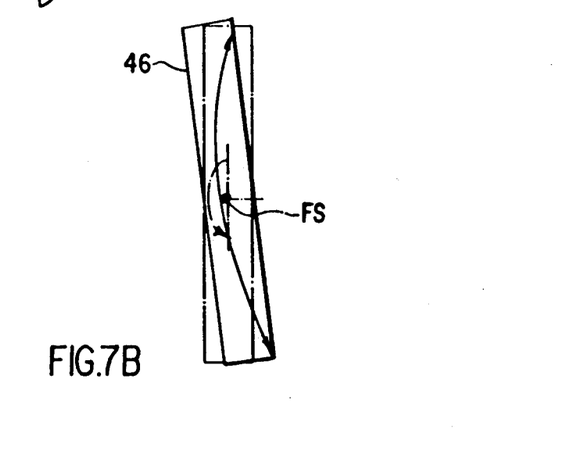
FIG. 7B schematically illustrates orientation of the optical system of FIG. 7A for linearizing the scan.

The scanned beam FS is bowed as it exits the scanner. By reason of the geometry of the system of FIGS. 1-3, the scanned beam FS moves slightly in the Z direction as shown in FIG. 3. The amount of bow is a function of angle $\beta$ and decreases as angle $\beta$ becomes smaller. In the convention of the drawing, there is a positive displacement in the +Z direction corresponding to the tine out condition and there is a corresponding displacement, of smaller magnitude, in the −Z direction. This results in the scanned beam being slightly canted to the vertical axis of the tuning fork and being slightly bowed. The scan can be linearized by post scanner optical systems employing transmissive or reflective optical elements or a combination of both. One transmissive type is illustrated in FIGS. 6A and 6B. In the arrangement of FIG. 6A, a spherical lens 40 is placed in the path of the scanned beam FS downstream of the scanner 20. The scan line 42 is linearized by rotating lens 40 about an axis 44 which is perpendicular to the scanned beam FS. Rotating the lens about the axis 44 to a point where the mid-plane of the lens is parallel to the exit mirror face of the scanner, as shown in dotted lines in FIG. 6A, will substantially linearize the scan beam FS. Similarly, referring to FIG. 7A, placement of a cylindrical lens 46 in the path of the scan beam FS will linearize the beam. In this case, the cylindrical lens is rotated about the axis of the beam, as illustrated in FIG. 7B to the point where the axis of the cylindrical lens is parallel to the exiting reflective surface from which the beam leaves the scanner.

Figure 8:
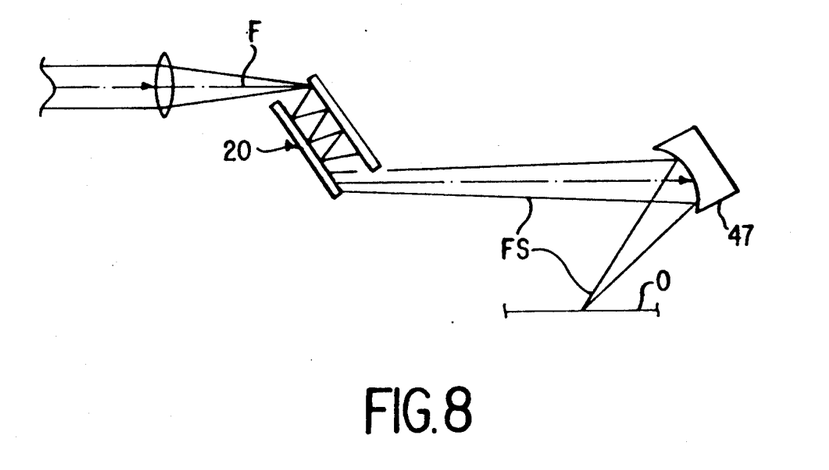
FIG. 8 shows an optical system to linearizing the scan utilizing a reflective optical element.

For increased efficiency and simplification of design, reflective optical elements can also be used for bow correction. For example, as shown in FIG. 8, the beam F is incident on one of the reflective surfaces of scanner 20, thereby resulting in scanned beam FS. The beam FS is directed onto a cylindrical reflective element 47. The longitudinal axis of element 47 is substantially parallel to the reflective surface from which the beam leaves the scanner 20. The beam reflected from element 47 is linearized and forms a straight scan line on object surface 0, which extends in a direction orthogonal to the plane of FIG. 8. Thus it is evident that optical systems of reduced complexity can be utilized with the disclosed scanner system to achieve a linear scan.

One of the features of the tuning fork scanner 20 is that the velocity of scan relationship is different from that achieved with polygonal mirrors. With the scanner 20, the scanned velocity is slowest at the ends of the scan and increases toward the center of the scan. With rotating polygonal mirror scanners, the opposite relationship is the case. That is scan velocities are highest at the ends of the scan and slowest at the middle of the scan.

Figure 9:
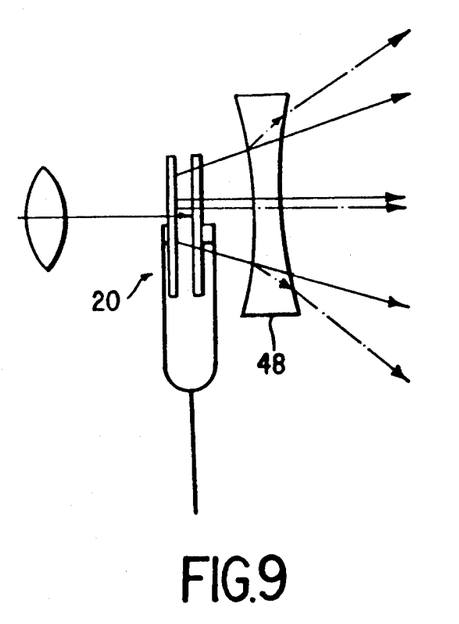
FIG. 9 is a schematic illustration of an optical system for linearizing the velocity and flattening the field of focus of the scanner of FIG. 1.

For some applications, it is desirable to have a linear scan velocity and this can be accomplished, as shown in FIG. 9, by the use of a negative lens 48 placed after the scanner 20 in the scan path. The negative lens is chosen to compensate for the velocity of scan; that is, the angular displacement of the beam increases as the beam moves from the center of the negative lens. In the arrangement of FIG. 9, a positive lens is placed before the scanner to give the desired overall system focal length and/or scanner spot size.

Figure 10A:
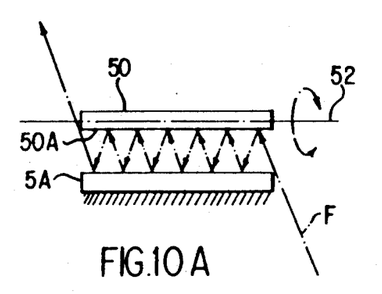
FIG. 10A is a side schematic illustration of another form of scanner in accordance with the invention utilizing a rocking reflective surface.
Figure 10B:
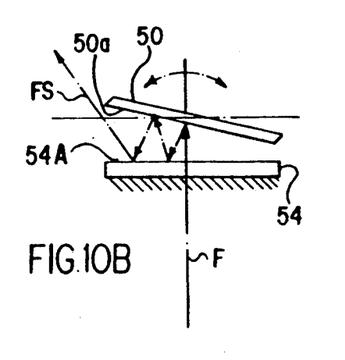
FIG. 10B is an end view of the scanner of FIG. 10A.

The benefits of multi-reflection amplification of scan can also be achieved in other scanner designs. For example, in FIG. 10A, a galvanometer type scanner having a mirror 50 which is rocked about the axis 52 is positioned with its reflective surface 50a placed in opposed and parallel relationship to a fixed mirror 54. In this arrangement, the input beam F is incident on the mirror 50 along axis 52 and is reflected a multiplicity of times between the mirror surfaces. FIG. 10B shows an end wise view of the scanner shown in FIG. 10A and illustrates the angular deflection of the beam as it exits the scanner from the mirror surface 54a. In this manner, the scan angle can be multiplied as a function of the number of reflections between the opposed mirror surfaces as the beam travels through the scanner.

Figure 11A:
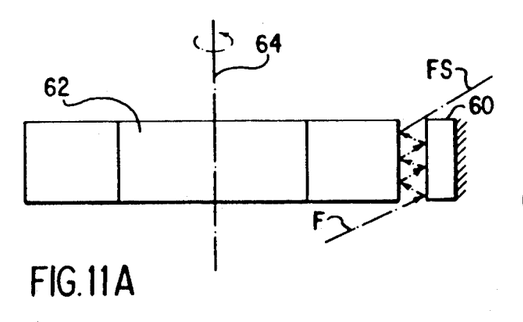
FIG. 11A is a side schematic illustration of a polygonal rotating mirror scanner employing the invention.
Figure 11B:
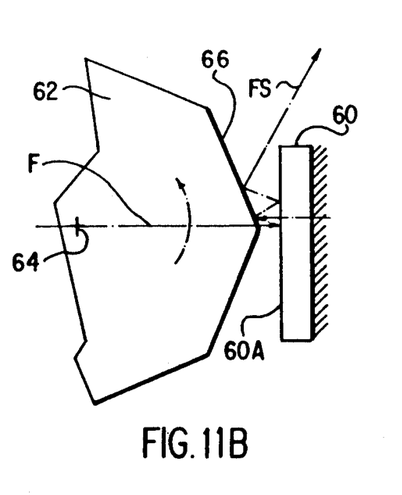
FIG. 11B is a partial top view of the scanner schematically illustrated in FIG. 11A.

FIGS. 11A and 11B show multi-reflection amplification by the positioning of a fixed mirror 60 adjacent a rotating polygonal mirror 62. The polygonal mirror is rotated about axis 64 in the direction indicated by the arrow. The beam to be scanned is introduced in the position orthogonal to the axis of rotation 64 of the polygonal mirror 62. The beam is incident on the reflective surface of mirror 60 and is reflected multiple times between the mirror 60 and one of the facets, such as facet 66, of the polygonal mirror 62, as illustrated in FIG. 10B. As the beam is reflected in the vertical path as shown in FIG. 11A between mirror 60 and facet 66, the beam is scanned in a horizontal direction by reason of movement of the facet 66. The result is a beam scan length which is greatly increased over arrangements wherein the beam to be scanned is merely reflected onto one of the facets of the polygonal mirror 62. In this manner, a scan arc of the beam FS can be increased.

Figure 12:
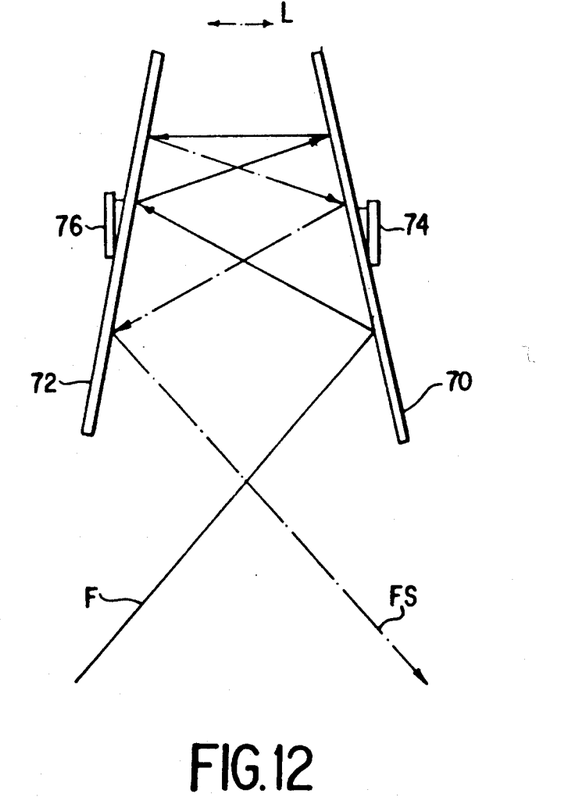
FIG. 12 shows a top view of a scanner employing non-parallel mirrors.

It should further be realized that scanning can be accomplished according to the present invention by the use of non-parallel reflective surfaces. Such an arrangement is shown in FIG. 12, which is somewhat exaggerated for purposes of illustration. In this arrangement, the incident beam F to be scanned is directed onto reflective member 70 and from the surface of member 70 to opposed reflective member 72. The members 70 and 72 are mounted on the interior surfaces of tines 74 and 76 of a tuning fork, which tines oscillate in the direction of doubleheaded arrow L. The members 70 and 72 are mounted angularly with respect to the tines and form a converging reflective channel between them. Typically, the angle formed between the two mirrors is a few degrees, usually less than 10°. The beam F progresses inwardly as it is reflected multiple times between the members 70 and 72 and then changes direction. The number of reflections (and thus the scan angle of beam FS) is a function of the angle of incidence of beam F and the angle between reflective members 70 and 72. It then progresses outwardly, leaving the scanner as scanned beam FS. Such an arrangement provides increased scan arc of the scanned beams for a given size of scanner and enhances the scanning of beams of large cross-section, as such beams can be introduced into the scanner at larger angles of incidence $\beta$ (FIG. 3). This can improve overall resolution of the system.

It can be realized from the foregoing description that scanners embodying the invention described above have significant advantages in terms of an increase in the scan width of the scanned beam. In addition, the system utilizing tuning forks has a number of additional advantages. Significant scan angles can be achieved in relation to the excursion of the mirrors. For example, 2° of tine deflection can yield a 30° scan arc in typical designs. It is highly reliable because there are no bearing surfaces or moving parts which are subject to wear. The system has the ability for sending clocking signals to a second scanning system for open loop RIS/ROS operation because it is highly frequency stable. The system provides a bidirectional scan and electrically variable scan angle and frequency. The optics of the scanner are protected, as the reflecting surfaces are internally directed. The scanner is small in size and weight and is easily manufacturable using uncomplicated hardware and electronics, factors which translate into lower costs. The scanned beam can be easily linearized by relatively simple optical systems.

What is claimed is:

1. A beam scanning apparatus comprising:
    a first reflective surface;
    a second reflective surface;
    means for mounting the first and second reflective surfaces with respect to each other in a manner forming a beam reflective channel therebetween;
    the beam channel comprising a beam inlet end and a beam outlet end, and defining a beam travel direction extending between the beam inlet and beam outlet ends and a beam scanning direction substantially perpendicular to the beam travel direction;
    a beam of radiation aligned to impinge against a first reflective surface, whereby the beam incident on the first reflective surface at the inlet end is reflected n times from the first reflective surface to the second reflective surface as the beam traverses the channel in the beam travel direction and exits from the outlet end thereof, wherein n≧2; and
    means for oscillating at least one of the reflective surfaces angularly with respect to the other reflective surface in a plane perpendicular to the beam travel direction and parallel to the beam scanning direction of the beam channel for causing the beam to scan along the beam scanning direction as the beam exits from the outlet end of the channel.

2. Beam scanning apparatus as in claim 1, wherein the oscillating means comprises a vibratory element.

3. Beam scanning apparatus as in claim 2, wherein the vibrating element is a resonant element.

4. Beam scanning apparatus as in claim 3, wherein the vibratory element is a tuning fork having two tines.

5. Beam scanning apparatus as in claim 1, wherein the oscillating means oscillating the first and second reflective surfaces angularly with respect to each other.

6. Beam scanning apparatus as in claim 5, wherein the oscillating means is a vibratory resonant element.

7. Beam scanning apparatus as in claim 6, wherein the oscillating means is a tuning fork having a pair of opposed tines and each of the reflective surfaces is mounted on one of the tines of the tuning fork.

8. Beam scanning apparatus as in claim 1, wherein the oscillating means oscillates said at least one reflective surface about an axis of rotation.

9. Beam scanning apparatus as in claim 1, and further comprising means for correcting for bow of the scanned beam exiting from the outlet of said channel.

10. Beam scanning apparatus as in claim 9, wherein the bow correcting means comprises a spherical lens.

11. Beam scanning apparatus as in claim 9, wherein the bow correction means comprises a cylindrical lens.

12. Beam scanning apparatus as in claim 1, wherein the first and second reflective surfaces are parallel.

13. Apparatus as in claim 12, wherein the first and second reflective surfaces are planar.

14. Beam scanning apparatus as in claim 1, wherein the first and second reflective surfaces are angularly disposed with respect to each other in the beam travel direction.

15. Beam scanning apparatus as in claim 14, wherein the first and second reflective surfaces are planar.

16. A beam scanning apparatus comprising:
a beam source;
a pair of reflecting surfaces mounted in a facing relationship and defining a guide path therebetween;
the guide path comprising a beam travel direction and a beam scanning direction perpendicular to the beam travel direction of the reflecting surfaces;
means for mounting the reflecting surfaces in the path of the beam from the beam source, whereby the beam is incident on one of the reflecting surfaces, is reflected along the beam travel direction of the guide path formed between the two reflective surfaces, and exits from the guide path; and
means for oscillating at least one of the reflecting surfaces with respect to the other reflecting surface in a plane perpendicular to the beam travel direction and parallel to the beam scanning direction of the guide path to cause the beam to be scanned along the beam scanning direction.

17. Apparatus as in claim 16, wherein said oscillating means comprises a tuning fork having first and second opposed tines and wherein one of said reflective surfaces is mounted on an interior surface of one of said tines and the other reflective surface is mounted on the other of said tines.

18. Apparatus as in claim 17, wherein the tuning fork further comprises means for driving said tines.

19. Apparatus as in claim 18, wherein the means for driving the tines comprises a piezo electric driver.

20. Apparatus as in claim 18, wherein said driving means further comprises a variable power supply means for controlling a maximum deflection angle and a scanning rate of said second beam.

21. Apparatus as in claim 20, wherein a power output amplitude of said variable power supply means is variable.

22. Apparatus as in claim 17, and further comprising means for linearizing the scanned beam.

23. Apparatus as in claim 22, wherein said linearizing means comprises a spherical lens in the path of the scanned beam.

24. Apparatus as in claim 22, wherein said linearizing means comprises a cylindrical lens in the path of the scanned beam.

25. Apparatus as in claim 17, and further comprising a positive lens in the path of the beam upstream of the reflective surfaces and a negative lens in the path of the beam downstream of the reflective surfaces.

26. Beam scanning apparatus as in claim 17, wherein the first and second reflective surfaces are parallel.

27. Apparatus as in claim 26, wherein the first and second reflective surfaces are planar.

28. Beam scanning apparatus as in claim 17, wherein the first and second reflective surfaces are angularly disposed with respect to each other in the beam travel direction.

29. Beam scanning apparatus as in claim 28 wherein the first and second reflective surfaces are planar.

30. Apparatus as in claim 16, wherein said reflective surfaces are trapezoidal.

* * * * *